J. T. HEANEY.
SLIP FOLDING MACHINE.
APPLICATION FILED APR. 23, 1915.

1,237,514.

Patented Aug. 21, 1917.
7 SHEETS—SHEET 1.

WITNESSES:
Marvin B Davis
Jean K Turner

INVENTOR
John T. Heaney
BY
Wm F Davis
ATTORNEY

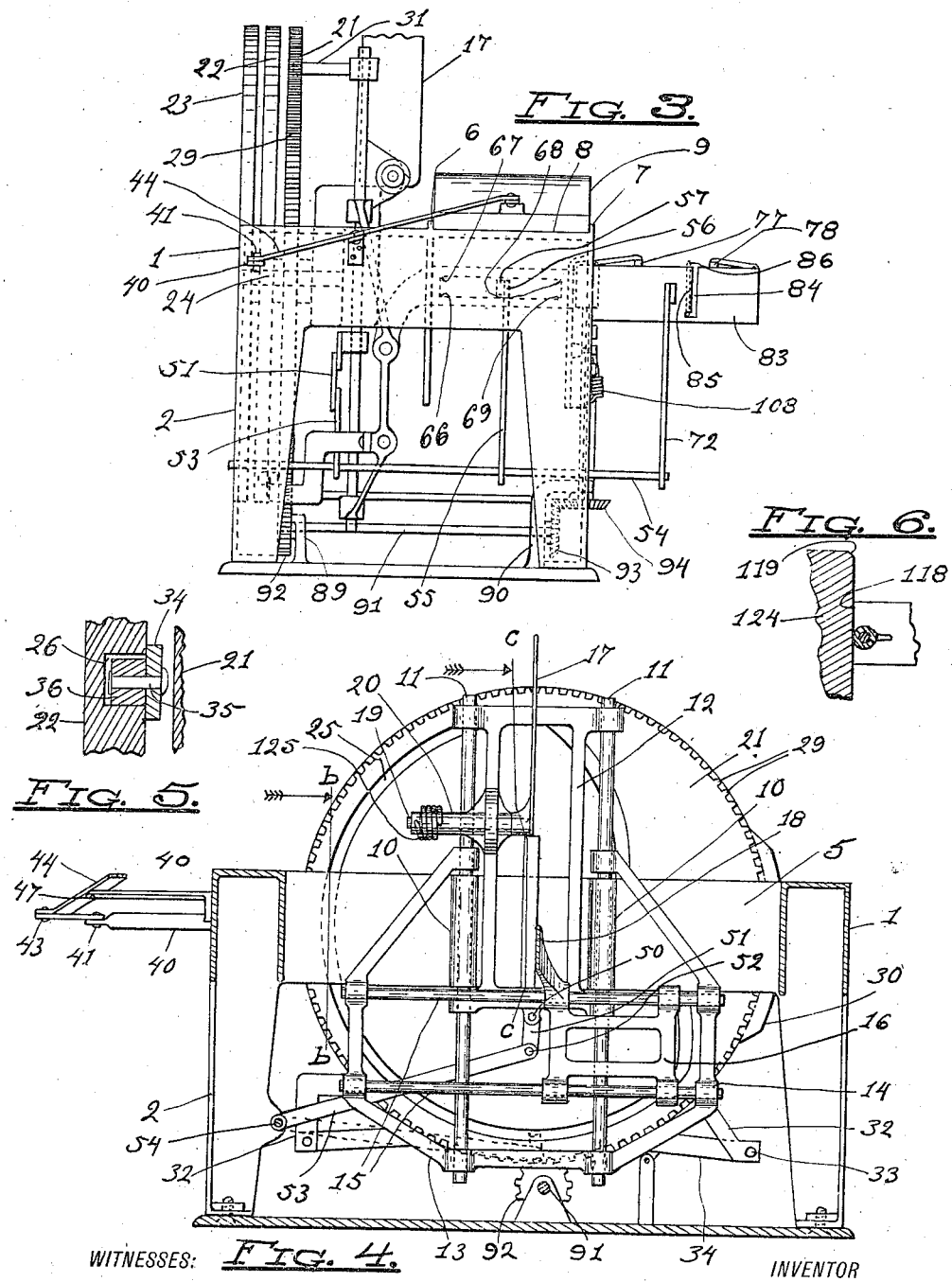

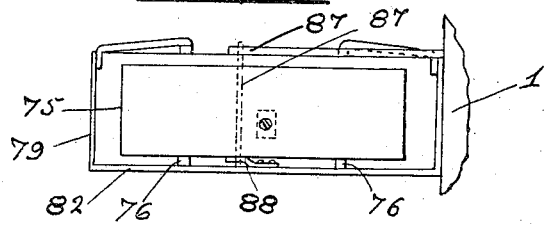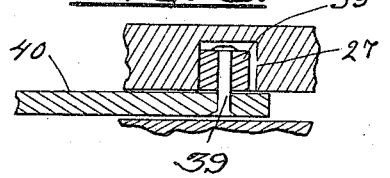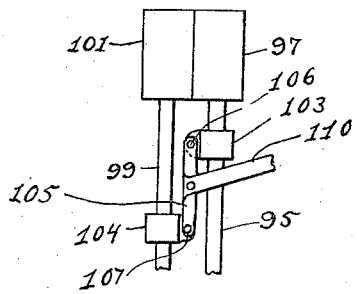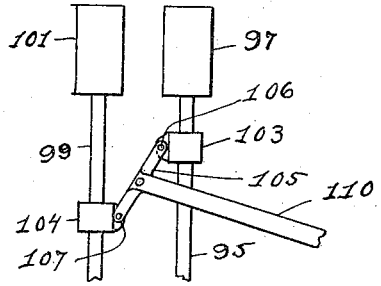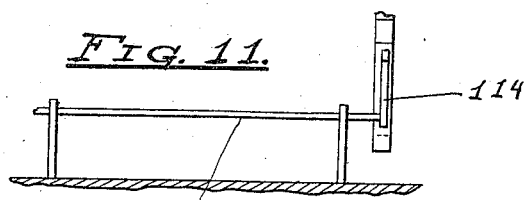

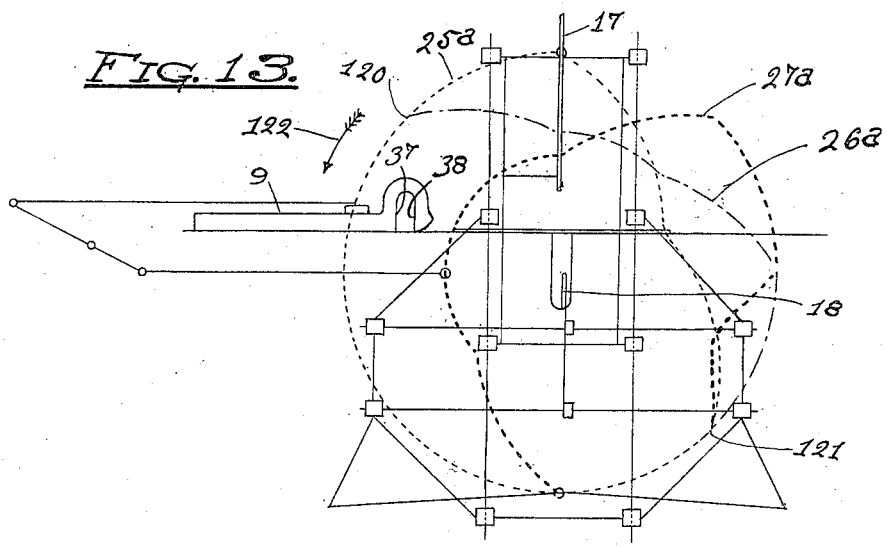
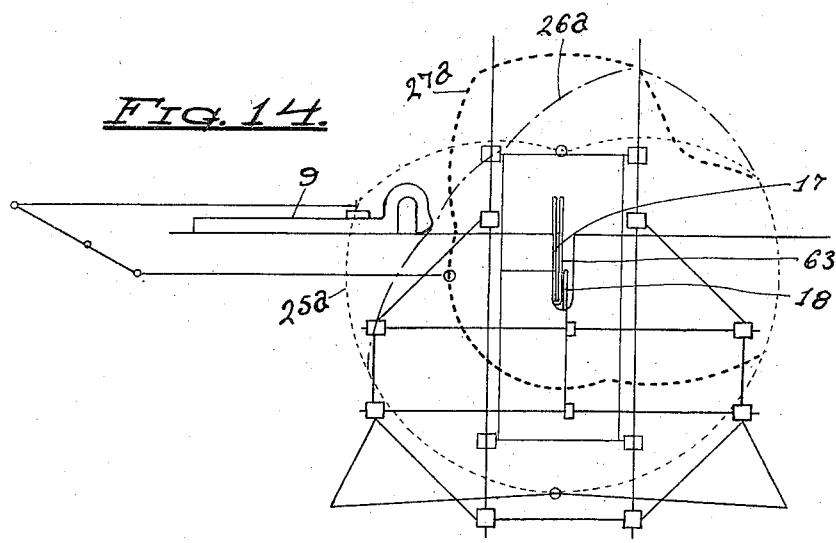

J. T. HEANEY.
SLIP FOLDING MACHINE.
APPLICATION FILED APR. 23, 1915.
1,237,514.
Patented Aug. 21, 1917.
7 SHEETS—SHEET 5.
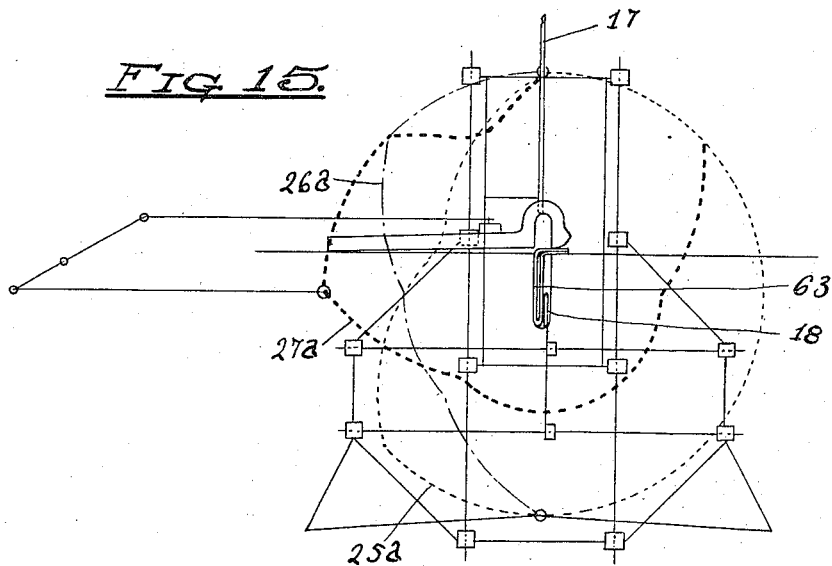
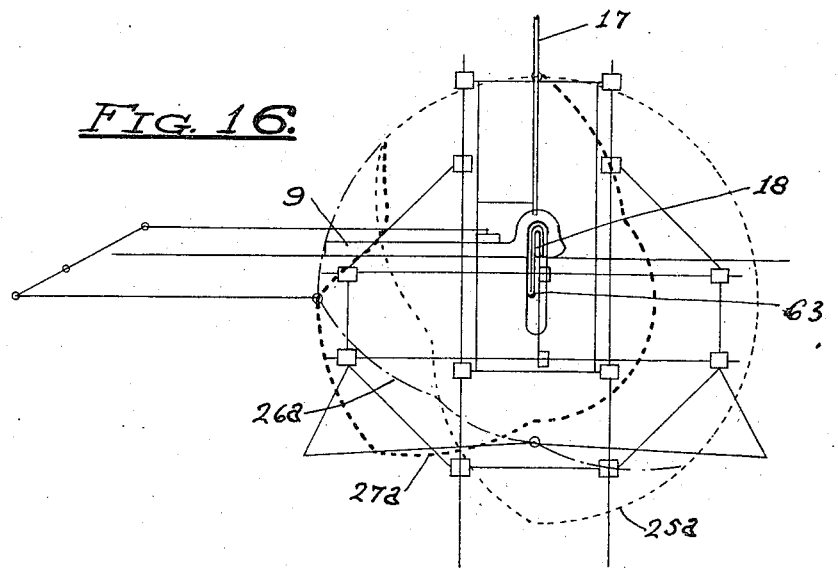
WITNESSES:
Marvin B. Davis.
Jean K. Turner.
INVENTOR
John T. Heaney
BY
Wm. F. Davis
ATTORNEY J. T. HEANEY.
SLIP FOLDING MACHINE.
APPLICATION FILED APR. 23, 1915.
1,237,514.
Patented Aug. 21, 1917.
7 SHEETS—SHEET 6.
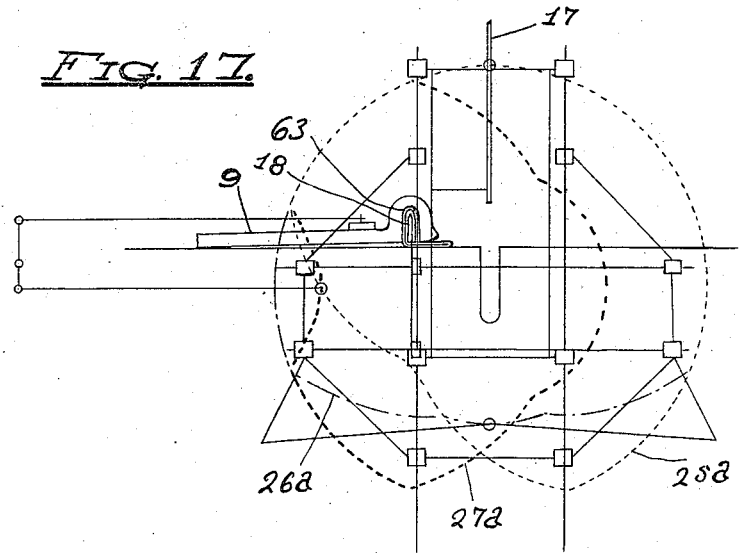
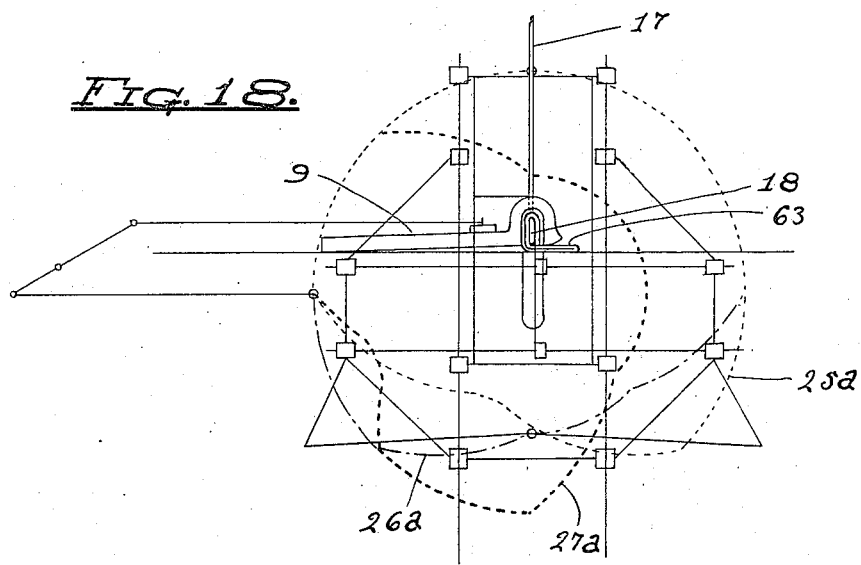
WITNESSES:
Marvin B. Davis.
Jean K. Turner
INVENTOR
John T. Heaney
BY
Wm. F. Davis.
ATTORNEY

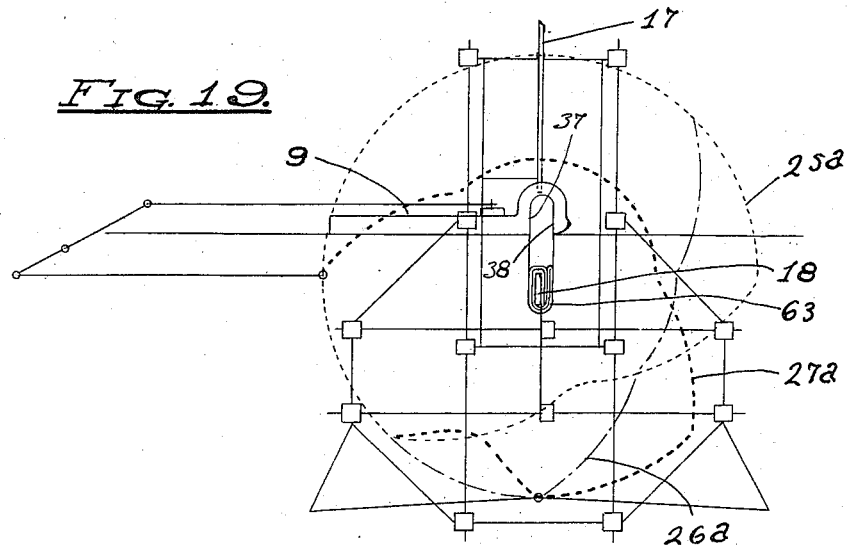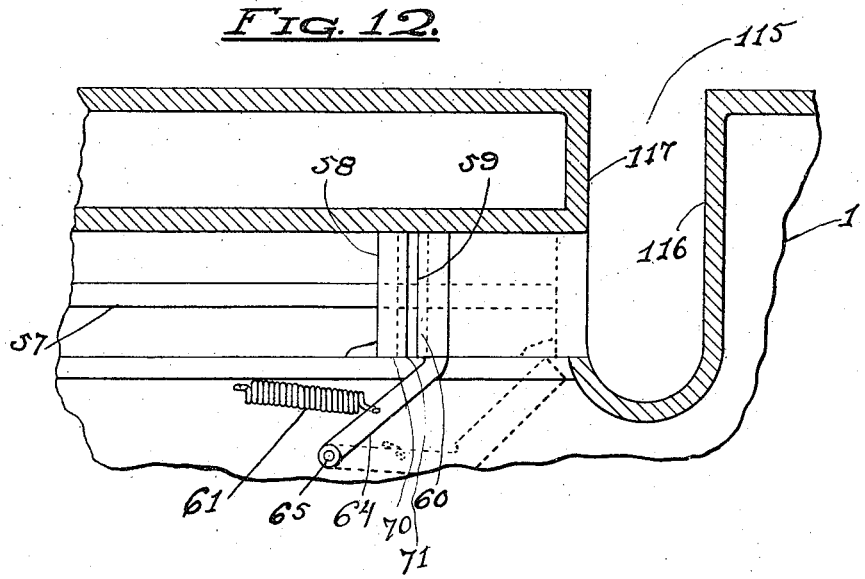

UNITED STATES PATENT OFFICE.

JOHN T. HEANEY, OF KANSAS CITY, MISSOURI.

SLIP-FOLDING MACHINE.

1,237,514.  Specification of Letters Patent.  Patented Aug. 21, 1917.

Application filed April 23, 1915. Serial No. 23,298.

*To all whom it may concern:*

Be it known that I, JOHN T. HEANEY, a citizen of the United States, residing at Kansas City, in the county of Jackson and State of Missouri, have invented certain new and useful Improvements in Slip-Folding Machines, of which the following is a full, clear, and exact description, such as will enable others skilled in the art to which it appertains to make and use the same.

The invention relates to a machine for folding, printing, and bundling mail slips and seeks to provide a simple and efficient form of machine which will receive the slips in a flat form and fold, print and bundle them in the manner required by railway mail clerks. Mail route slips are attached by the railway mail clerk to mail bags to designate the destination of the bag and to identify the clerk having closed the bag, also to indicate the train by which it was carried as well as the route traveled. These slips are furnished to the clerk in flat packages usually with certain data printed thereon, but the clerk is required to stamp or write thereon certain further information and to fold the slips in order to attach them to the bag, the bundling being a matter of convenience in carrying the slips preparatory to attaching them to the bag. The usual method of preparing the slips is to stamp thereon the reading matter that is required to be furnished by the clerk and then fold them by hand after which the slips are bundled by hand and secured in bundle form with rubber bands in which condition they are carried until attached to the mail bag, the foregoing operation being slow and tedious and consuming much time that would be avoided by a machine which will produce the required results more expeditiously.

The present invention seeks to provide an improved machine which will fold, print and bundle mail route slips and the like.

With the foregoing and other objects in view the invention consists in the features of improved construction, combinations and arrangements of parts hereinafter set forth, illustrated in the accompanying drawings and more fully pointed out in the appended claims.

In the drawings:—

Fig. 3 is a view in elevation of the machine at an angle of ninety degrees from that of Fig. 1.

Fig. 4 is a sectional view of the machine the view being taken on line *a—a* of Fig. 2.

Fig. 5 is an enlarged fragmentary view of the machine taken on line *b—b* of Fig. 4.

Fig. 6 is an enlarged fragmentary view taken on line *c—c* of Fig. 4.

Fig. 7 is an enlarged fragmentary view in end elevation.

Fig. 8 is an enlarged fragmentary sectional view taken on line *d—d* of Fig. 1.

Fig. 9 is an enlarged view in elevation of the slip discharging rollers in closed position.

Fig. 10 is an enlarged view in elevation of the slip discharging rollers in open position.

Fig. 11 is a fragmentary view of certain connecting means for the closing and separating of the slip discharging rollers.

Fig. 12 is an enlarged fragmentary sectional view taken on line *e—e* of Fig. 2.

Figures 1, 2:
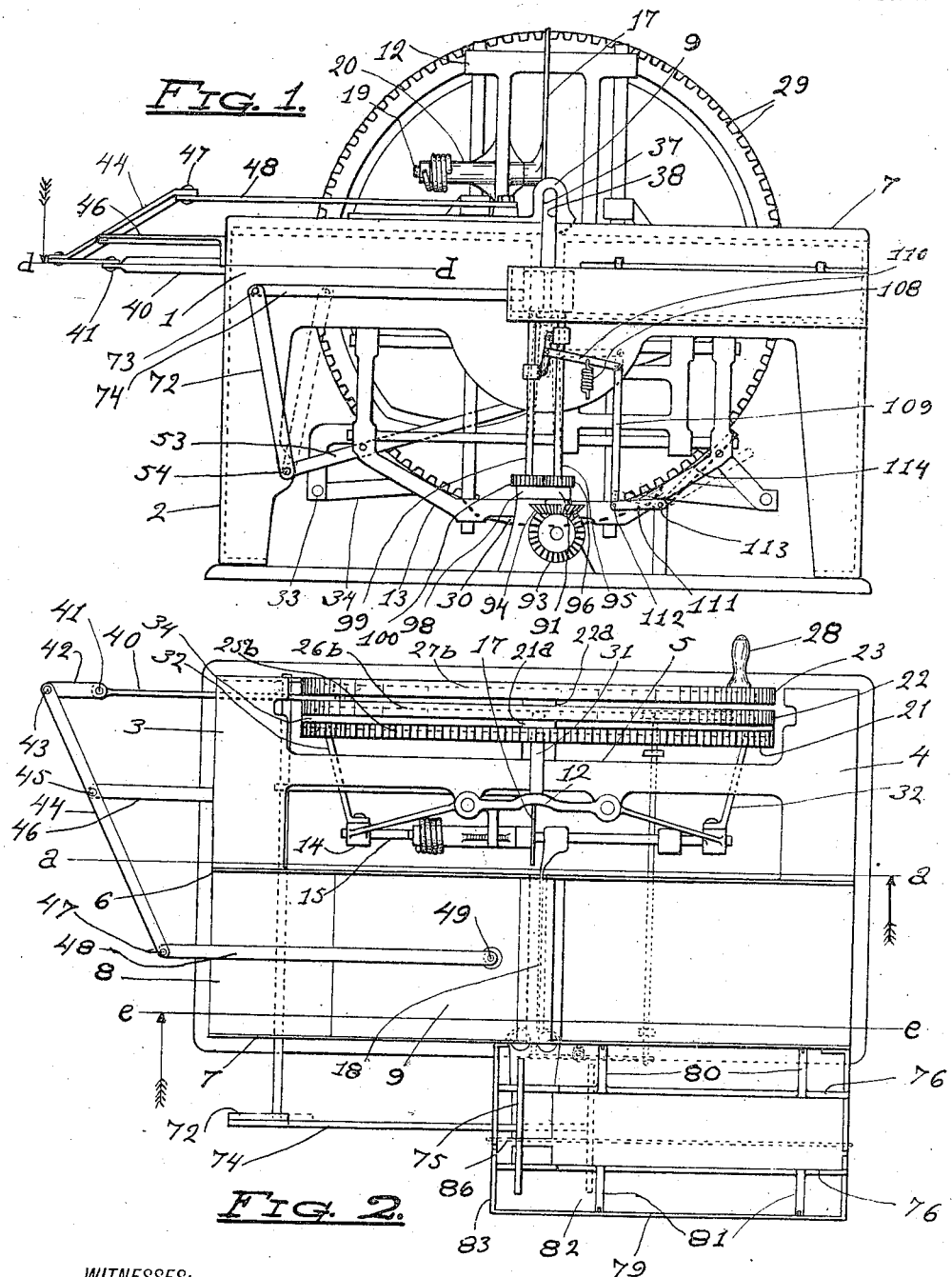
Figure 1 is a view in elevation of the improved slip folding printing and bundling machine.
Fig. 2 is a plan view of the improved machine.

Figs. 13 to 19 inclusive are diagrammatical views representing the operation of the machine and each presenting a different operative position.

The frame 1 is provided with legs 2, laterally projecting arms 3 and 4, the connecting bar 5 and guide strips 6 and 7 all preferably integral therewith, the platen 8 between guides 6 and 7 being preferably a smooth and true surface upon which the slips of paper to be folded are laid and upon which the folding slide 9 is fitted to traverse, within the bosses 10 which are integral with the connecting bar 5 are tightly fitted and positioned one parallel with the other the cylindrical guide bars 11, both standing at an approximate right angle to the platen 8 and having fitted thereon to freely slide, the upper crosshead 12 and the lower crosshead 13, the latter having securely fitted thereto and positioned parallel with the platen 8, connection being completed in hubs 14, the guides 15 to which is fitted to freely slide the auxiliary crosshead 16, the crosshead 12 being for the operation of the upper folding blade 17, while the lower crosshead 13 and auxiliary crosshead 16 are arranged to accommodate the operation of the lower folding blade 18, the latter being rigid with the crosshead 16 and positioned at an approximate right angle to the guides 15, while the upper blade 17 is rigidly mounted on shaft 19, the latter shaft being journaled in the hub 20 of the crosshead 12, so that the blade may assume an upright position when fully lifted to the end of its travel, provisions being made as will appear hereinafter to rotate the shaft 19 and position the blade horizontally early in each downward stroke.

The cams 21 and 22, and 22 and 23 are separated by hubs 21$^a$ and 22$^a$ respectively the hubs being integral with cams 21 and 22 respectively, the cams being mounted to revolve on the shaft 24 shown only in dotted lines because of the shaft serving only as a common journal, the cams being of common and well known construction excepting the direction of the grooves 25, 26 and 27 respectively the direction of the grooves being indicated by the direction of the dotted lines 25$^a$, 26$^a$ and 27$^a$ respectively of all the diagrammatical views and the depth of the grooves being indicated by the dotted lines 25$^b$, 26$^b$, and 27$^b$ respectively of Fig. 2, the grooves all entering the cams from the side nearest to the frame 1.

To the cam 23 is secured the handle 28 by which all the cams are simultaneously rotated. It is obvious however that other means of rotating the cams can be applied without invention, the cam 21 being provided with gear teeth 29 and the cam 22 with an auxiliary cam 30, the object of the gear teeth and the auxiliary cam being described hereinafter.

The upper crosshead 12 is provided with an arm extending into the groove 25 and is shown in Fig. 1 in elevated position, the lower crosshead 13 in this figure being in lowered position, and the crosshead 16 at one end of its travel. The crosshead 13 has projecting arms 32 to which is secured by rivets 33 the bar 34, which lies between the cams 21 and 22 and has journaled thereto by pin 35 the roller 36, the latter extending into the groove 26 and imparting motion to the crosshead corresponding to the direction of the groove as the cam is rotated. The crosshead 16 travels upward and downward with the crosshead 13 by reason of the connection therewith through guide bars 15 and on each upward stroke the folding blade 18 enters between the walls 37 and 38 of the block 9 which carries the crosshead 16 and blade 18 to the opposite end of their travel and returns them before they are again lowered by the cam groove 26, this movement will be more fully understood from the description of the operation of the machine hereinafter.

In the cam 23 is the cam groove 27 the depth of which is indicated by dotted lines 27$^b$ and the direction by dotted line 27$^a$ of all the diagrammatical views. In the cam groove 27 is the pin 39 secured to the slide bar 40 and provided with the roller 39$^a$, the bar being fitted to slide in the arm 3 of the frame 1, the slide bar being pivoted at 41 to the link 42 which in turn is pivoted at 43 to the lever 44 the latter being fulcrumed at 45 to the stationary extension bar 46 and pivoted at 47 to the connecting bar 48, said connecting bar being pivoted at 49 to the slide block 9 and completing the connections by which the slide block is driven to conform to the direction of groove 27 the motion of the block being always opposite to that of the groove owing to the lever 44 reversing the motion.

Pivoted to the upper crosshead 12 at 50 is the link 51, the link being pivoted at 52 to the lever 53 and the lever rigidly secured to shaft 54 so that each lowering of the crosshead 12 will oscillate the shaft. The lever 55 is rigidly secured to the shaft 54 and has pivoted to the upper end thereof at 56 the connecting bar 57, the latter being rigid with printing block 58 which is provided on face 59 with any usual printing means, the parts being shown in enlarged view in Fig. 12 with the usual form of inking pad 60 resting on the face 59 and held in contact by spring 61, the view illustrating by dotted lines the position of the block and the pad at the moment of printing the slip 63, the pad having rigid therewith the arm 64 pivoted at 65, the block being fitted to slide in guides 66, 67, 68 and 69 and so positioned that the pad 60 is moved from the position shown in full lines of Fig. 12 to that of the dotted lines same figure during the printing stroke of the block and from the position of the dotted lines to that of the full lines during the return stroke, the spring always holding the pad against the block when in the position of full lines, the movement of the pad from the path of the block being accomplished by the bearing of the corner 71 against face 59 of the block.

Rigidly mounted on the shaft 54 is the arm 72 to which is pivoted at 73 the connection bar 74 on the opposite end of which is rigidly mounted the packing block 75 shown in one extreme position in full lines and in the opposite position in dotted lines the movement being transmitted from cam 21 through crosshead 12 link 51, lever 53, shaft 54, arm 72 and connecting bar 74, the packing block resting on the track bars 76 immediately over which are positioned the gripping slides 77 and 78 which are connected to the frame 1 and the wall 79 respectively by springs 80 and 81 respectively so that the folded route slips 63 when packed between the track bars and the gripping bars will be gripped and held in the position to which they are packed by the block 75, the wall 79 being secured to the bottom plate 82 and the latter to the frame 1, the wall 83 closing one end of the box like structure formed by frame 1, bottom 82 and wall 79. The wall 83 is provided with the slotted L shaped opening 84 forming a portion of the wall 85 extending into the slot for the purpose of supporting one end of a rubber band as 86, the opposite end of the band being supported by fingers 87 and 88 so that the slips 63 may be packed within the expanded band until the desired number have been folded and packed therein, after which the band may be released from the extending portion 85 of the wall 83 and from the fingers 87 and 88, when the band will contract and grip and hold the slips in bundle form, and in this form they may be removed from between the track bars 76 and gripping bars 77 by passing them outward between the fingers 87 and 88. Journaled in boxes 89 and 90 is shaft 91 on one end of which is rigidly mounted the pinion 92 meshing in the teeth 29 of the cam 21, while on the opposite end of the shaft is rigidly mounted the bevel gear 93, the latter meshing in bevel gear 94 which is rigidly secured to the shaft 95. The shaft 95 has rigidly mounted thereon the gear 96 and the roller 97 and is loosely journaled in the box 98 so that the roller may swing with the respective end of the shaft from side to side, while shaft 99 has mounted thereon the gear 100 meshing in gear 96, and the roller 101, the shaft 99 also being loosely journaled in box 98 so that the roller may swing with the respective end of the shaft from side to side, so that the rollers may separate to allow the route slip 63 to be folded there-between and then closed and gripped on the slip to convey it from the position occupied when the fold is completed to the path of the packing block 75, the gears being so arranged that the rollers always revolve while the cam 21 is in rotation in a direction that will convey the slip to the path of the block.

The rollers 97 and 101 are separated and forced together by the sleeves 103 and 104 respectively, mounted on the shafts 95 and 99 respectively, to which is pivoted the arm 105 at 106 and 107 respectively, the arm 105 being held normally with the rollers in separated positions by the spring 108, and with the rollers in closed position by connecting rod 109 pivoted to the arm 110 and to the rocker arm 111 at 112, the rocker arm being rigidly mounted on the shaft 113 to which is rigidly secured the rocker arm 114, the latter being suitably positioned to engage the auxiliary cam 30, the rollers being separated when the arm 114 is resting on the concentric surface of cam 22 and closed when arm 114 engages and traverses the auxiliary cam 30.

In the diagrammatical views, Figs. 13 to 19 inclusive the folding of the route slip is illustrated step by step, this being the chief function of the machine. Referring to Fig. 13, it will be understood that while $25^a$ represents the course of the cam groove 25, $26^a$ cam groove 26 and $27^a$ cam groove 27, the three grooves just mentioned follow a common and like course from the character numeral 120 circumferentially in the direction of arrow 122 to the numeral 121 and that in operation the cams are always rotated in the direction of the arrow, but one line being shown from 120 to 121 in the direction just described in order to save the confusion of unnecessary lines.

Beginning with the position shown in Fig. 13 with the folding slide 9 at the extreme distance from the folding space 115 formed by walls 116 and 117, the upper crosshead 12 and the upper folding blade 17 at the extreme upward travel, the lower crosshead 13 in lowered position with the lower folding blade 18 resting in the space 115 near the wall 116, the printing block 58 in the position shown in full lines of Fig. 12, and the rollers 97 and 101 separated, the route slip 63 is laid flat on the face of the platen 8 and one turn of the cams 21, 22 and 23 which may be accomplished with the handle 28 will fold the slip, print it, discharge it from the machine and pack it between the track bars 76 and the gripping bars 77.

In revolving the cams from the position of the view Fig. 13 to that of Fig. 14 the crosshead 12 is lowered to the extreme lowest position and during the early part of the downward stroke, the heel 118 of the blade 17 is drawn over the corner 119 of the guide block 124, which turns the blade from the vertical position shown in Fig. 3 to the horizontal as shown in Fig. 6 and in the latter position the blade is lowered and the route slip folded as shown in Fig. 14, the printing block being so timed that it reaches the position of dotted lines in the view Fig. 12 and prints the slip at the same instant that it reaches the position of the view Fig. 14.

As the cams are advanced from the position shown in Fig. 14 to that of Fig. 15 the crosshead 12 is raised carrying the blade 17 with it, and as the heel 118 reaches and passes the corner 119 of the guide block 124 the spring 125 returns the blade to the vertical position so that it will not interfere with folding the next route slip on the platen 8. During the upward movement of crosshead 12 the folding slide 9 is advanced to the position of the view Fig. 15 folding the route slip as shown in the view, and as the folding slide reaches this point the crosshead 13 begins the upward travel by reason of cam groove 26 the blade 18 being lifted to the extreme upward movement and folding the route slip as shown in Fig. 16, the folding slide 9 following the course of the groove 27 now travels to the position of the view Fig. 17 and folding the slip as shown in this view, the next movement being the return of the slide block to the position of Fig. 18 when the crosshead 13 following the groove 26 lowers the blade 18 to the position of the view Fig. 19, the folding operation now being complete.

It will be noticed that the foregoing operations have required less than three fourths of a revolution of the cams 21, 22 and 23 and the auxiliary cam 30 now reaches the arm 114 and closes the rollers 97 and 101 on the slip and as the rollers revolve continuously at a rapid speed the slip is instantly discharged from the groove 115 and to a position in the path of the packing block 75, the packing block packing the slip under the gripping slides 77 during the downward stroke of the crosshead 12 on the next folding operation, the revolving of the cams and the folding of the slips being continuous as long as the cams are rotated and the slips placed on the platen 8 at the proper time.

It is obvious that numerous changes may be made in the details as set forth without departure from the essentials of the invention.

What I claim as new and desire to secure by Letters Patent is:—

1. The combination of a frame provided with a flat level surface on the top thereof and a vertical groove therein, a block arranged to traverse on said flat level surface and provided with a groove therein and said grooves arranged at right angles from the travel of said block and adapted to be brought into register, a blade arranged to pass from the groove in said frame into the groove in said block when in register, means whereby said block will traverse said flat level surface and carry said blade and a slip of paper, and means whereby said blade will fold said slip of paper into the groove in said frame when said grooves register.

2. The combination of a frame provided with a groove, a block provided with a groove and arranged to slide on said frame to bring said grooves into register, a blade arranged to fold a portion of a slip of paper from said groove in said frame into said groove in said block when said grooves resister, means whereby said block may be withdrawn from said registered position and returned thereto, and means whereby said blade will fold said slip into the groove in said frame.

3. The combination of a frame provided with a transverse groove, a block provided with a transverse groove and adapted to move and bring said groove into register, a blade arranged to fold a portion of a slip into the groove in said block when said grooves register, said block arranged to carry said blade and said slip from the groove in said frame and return thereto, and said blade arranged to fold said slip into the groove in said frame when said block is returned and said grooves register.

4. The combination of a frame provided with a groove, a blade arranged to fold a slip into said groove, a block provided with a groove and arranged to slide on said frame to bring said grooves into register, means to advance said block so that said grooves will register, a second blade arranged to fold said slip into said groove in said block and said means arranged to withdraw said block from the position where said grooves register.

5. The combination of a frame provided with a groove, a blade arranged to fold paper into said groove and withdraw therefrom, a folding block provided with a groove arranged to traverse said frame and register said grooves, a second blade arranged to fold said paper into the groove in said block, plural cams mounted adjacent said frame, and means connecting said cams and said folding block and said folding blades whereby said blades are inserted into said grooves and withdrawn therefrom and said folding block is reciprocated on said frame and withdraw said paper from said groove in said frame.

6. The combination of a frame provided with a groove, a blade, means arranged whereby said blade will fold paper into said groove and withdraw therefrom, a block provided with a groove, means to slide said block on said frame and register said grooves, a second blade, means to pass said second blade from the groove in said frame into the groove in said block when said grooves register and carry the paper into said groove in said block, means arranged to withdraw said block from said groove in said frame and return it thereto, said means operating said second blade arranged to pass said second blade with the paper thereon into the groove in said frame, and a pair of rolls arranged to withdraw said paper from the groove in said frame.

7. The combination of a frame provided with a groove, a blade arranged to fold paper into said groove, a folding block provided with a groove and arranged to traverse said frame and register said grooves, a second blade arranged to fold paper from the groove in said frame into the groove in said block when said grooves register, said block arranged to withdraw from said registered position and draw the paper from the groove in said frame, means whereby said last mentioned blade will return and fold the paper into the groove in said frame from the groove in said block, means to discharge the paper from the groove in said frame, and means to pack the folded paper in bundles.

8. The combination of a frame provided with a groove, a blade arranged to fold paper into said groove, a folding block provided with a groove and arranged to traverse said frame and register said grooves, a second blade arranged to fold the paper into the groove in said block, means to withdraw said block from said registered position and draw said paper from the groove in said frame and return to said registered position, means whereby said last mentioned blade will fold the paper into the groove in said frame, means to discharge the paper from the groove in said frame after it is folded, means to support a rubber band, and means to pack said folded paper in bundles within said rubber band.

9. The combination of a frame provided with a groove, means to fold a slip of paper into said groove, a block provided with a groove and arranged to traverse said frame and register said grooves, means to fold the slip into the groove in said block, means arranged to traverse said block on said frame and return said block to said registered position, and said second means arranged to fold the paper into the groove in said frame when said grooves register.

10. The combination of a frame provided with a groove, a block provided with a groove adapted to be alined with the groove in said frame, means to fold a slip of paper into said frame groove, means to fold the slip into said block groove, means to traverse said block on said frame and realine said grooves, said second means arranged to fold said slip of paper into said frame groove when said grooves register, and means to discharge said slip from the groove in said frame.

In testimony whereof I affix my signature in the presence of two witnesses.

JOHN T. HEANEY.

Witnesses:
BERTHA VAN DERVEER,
JAMES H. SHERMAN.

Copies of this patent may be obtained for five cents each, by addressing the "Commissioner of Patents Washington, D. C."